(12) United States Patent
Tourrilhes et al.

(10) Patent No.: US 12,335,125 B2
(45) Date of Patent: Jun. 17, 2025

(54) BANDWIDTH ESTIMATE FILTERING BASED ON PACKET LOSS PATTERNS

(71) Applicant: HEWLETT PACKARD ENTERPRISE DEVELOPMENT LP, Houston, TX (US)

(72) Inventors: Jean Tourrilhes, Milpitas, CA (US); Puneet Sharma, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 555 days.

(21) Appl. No.: 17/728,859

(22) Filed: Apr. 25, 2022

(65) Prior Publication Data

US 2023/0344733 A1    Oct. 26, 2023

(51) Int. Cl.
*H04L 43/0894* (2022.01)
*H04L 43/0829* (2022.01)
(Continued)

(52) U.S. Cl.
CPC ...... *H04L 43/0894* (2013.01); *H04L 43/0829* (2013.01); *H04L 43/0852* (2013.01);
(Continued)

(58) Field of Classification Search
CPC . H04L 43/0829; H04L 43/0852; H04L 43/12; H04L 43/0817; H04L 45/125;
(Continued)

(56) References Cited

U.S. PATENT DOCUMENTS

| 6,839,754 B2 | 1/2005 | Nowak et al. |
| 7,065,482 B2 | 6/2006 | Shorey et al. |

(Continued)

FOREIGN PATENT DOCUMENTS

| CA | 2291835 A1 | 6/2001 |
| CN | 109905257 A | 6/2019 |

(Continued)

OTHER PUBLICATIONS

Aalto University, Congestion Control Using FEC for Conversational Media, 2014, pp. 1-9, Retrieved from the Internet Oct. 21, 2019 from URL: tools.ietf.org/id/draft-singh-rmcat-adaptive-fec-01.XML>.

Anup et al. "An Enhanced Available Bandwidth Estimation Technique for an End-to-End Network Path." Dec. 2016. (Year: 2016).

(Continued)

*Primary Examiner* — Omer S Mian

(74) *Attorney, Agent, or Firm* — Sheppard Mullin Richter & Hampton LLP

(57) ABSTRACT

Systems and methods are provided for effectuating a filtering technique that can enable available bandwidth (e.g., on a network path) to be estimated in the presence of moderate losses caused by certain queue management techniques. When packet losses exist on a network path due to certain types of packet queue transmission mechanisms, methods, or models, a bump detection algorithm (BDA) can be used to perform bandwidth estimation. When a pattern of packet loss is identified (from its signature) as being one with which BDA can be performed to accurately estimate available bandwidth on a network path, the BDA-based bandwidth estimate may be used to place/route and load balance network traffic, or otherwise used to engage in network traffic engineering, take other network-related action(s), or reported out. Otherwise, the bandwidth estimation is suppressed and not used.

20 Claims, 9 Drawing Sheets

(51) Int. Cl.
*H04L 43/0852* (2022.01)
*H04L 43/0882* (2022.01)
*H04L 43/10* (2022.01)
*H04L 43/12* (2022.01)
*H04L 47/11* (2022.01)
*H04Q 3/00* (2006.01)
*H04W 24/06* (2009.01)
*H04L 43/0817* (2022.01)
*H04L 45/125* (2022.01)
*H04L 47/10* (2022.01)

(52) U.S. Cl.
CPC ...... *H04L 43/0858* (2013.01); *H04L 43/0882* (2013.01); *H04L 43/10* (2013.01); *H04L 43/12* (2013.01); *H04L 47/11* (2013.01); *H04Q 3/0091* (2013.01); *H04W 24/06* (2013.01); *H04L 43/0817* (2013.01); *H04L 43/0835* (2013.01); *H04L 45/125* (2013.01); *H04L 47/10* (2013.01)

(58) Field of Classification Search
CPC ..... H04L 43/16; H04L 43/0858; H04L 43/10; H04L 43/0894; H04L 43/0882; H04L 43/0835; H04L 47/10; H04L 47/11; H04W 24/06; H04Q 3/0091
See application file for complete search history.

(56) References Cited

U.S. PATENT DOCUMENTS

| | | | |
|---|---|---|---|
| 7,072,304 | B2 | 7/2006 | Ng et al. |
| 7,180,858 | B1 | 2/2007 | Roy et al. |
| 7,301,907 | B2 | 11/2007 | Anbarani |
| 7,315,515 | B2 | 1/2008 | Pazos |
| 7,525,923 | B2 | 4/2009 | Matta |
| 7,729,268 | B2 | 6/2010 | Matta et al. |
| 7,768,926 | B2 | 8/2010 | Bellur et al. |
| 7,907,519 | B2 | 3/2011 | Songhurst et al. |
| 7,948,878 | B2 | 5/2011 | Briscoe et al. |
| 8,000,235 | B2 | 8/2011 | Noy et al. |
| 8,144,586 | B2 | 3/2012 | Mcnaughton et al. |
| 8,223,634 | B2 | 7/2012 | Tanaka et al. |
| 8,934,338 | B2 | 1/2015 | Jacquet et al. |
| 9,270,568 | B2 | 2/2016 | Flinta et al. |
| 9,548,936 | B2 | 1/2017 | Lee et al. |
| 9,654,370 | B2* | 5/2017 | Welin ................. H04L 43/0882 |
| 9,906,427 | B2 | 2/2018 | Siemens et al. |
| 9,998,400 | B2 | 6/2018 | Briscoe et al. |
| 11,228,533 | B2 | 1/2022 | Tourrilhes et al. |
| 2007/0115814 | A1 | 5/2007 | Gerla et al. |
| 2008/0259813 | A1 | 10/2008 | Matta et al. |
| 2011/0149751 | A1* | 6/2011 | Li ........................ H04L 41/147 370/252 |
| 2011/0176429 | A1* | 7/2011 | Johnsson ............ H04L 43/0852 370/241 |
| 2014/0056234 | A1* | 2/2014 | Hedlund ............. H04L 43/0882 370/329 |
| 2015/0195205 | A1 | 7/2015 | Flinta et al. |
| 2015/0257162 | A1 | 9/2015 | Reider et al. |
| 2015/0333993 | A1 | 11/2015 | Welin et al. |
| 2016/0344608 | A1 | 11/2016 | Siemens et al. |
| 2017/0324664 | A1 | 11/2017 | Xu et al. |
| 2021/0243133 | A1 | 8/2021 | Tourrilhes et al. |
| 2021/0344581 | A1 | 11/2021 | Tourrilhes et al. |

FOREIGN PATENT DOCUMENTS

| | | | |
|---|---|---|---|
| CN | 112653635 | A | 4/2021 |
| EP | 1758313 | A1 | 2/2007 |
| EP | 2031807 | A1 | 3/2009 |
| EP | 2575303 | A1 | 4/2013 |
| KR | 10-2011-0137653 | A | 12/2011 |
| WO | WO-2023202437 | A1 * | 10/2023 |

OTHER PUBLICATIONS

Huang et al. "Available Bandwidth Estimation via One-Way Delay Jitter and Queuing Delay Propagation Model." 2006 (Year: 2006).
Lin et al., "A novel hybrid probing technique for end-to-end available bandwidth estimation," IEEE Local Computer Network Conference, Denver, CO, USA, 2010, pp. 400-407.
Ribeiro et al., "PathChirp: Efficient Available Bandwidth Estimation for Network Paths", in Proceedings of 4th passive active measurement workshop, 2003,.
Ribeiro, V., et al. "Pathchirp: A light-weight available bandwidth estimation tool for network-aware applications." Proceedings of 2003 LACSI Symposium. New Mexico: LACSI Press, 2003, 12 pages.
Series Y: Global Information Infrastructure, Internet Protocol Aspects, Next-Generation Networks, Internet of Things and Smart Cities, pp. 1-48, Retrieved from the Internet Oct. 21, 2019 from URL: <itu.int/rec/dologin_pub.asp?lang=e&id=T-REC-Y.1543-201806-IIIPDF-E&type=items>.
Strauss et al., "A Measurement Study of Available Bandwidth Estimation Tools," IMC'03, Oct. 27-29, 2003, 6 pages.
Wikipedia, "TCP congestion control," Oct. 23, 2021, <https://en.wikipedia.org/w/index.php?title=TCP_congestion_control&oldid=1051487581>. 15 pages.

* cited by examiner

BANDWIDTH ESTIMATE FILTERING BASED ON PACKET LOSS PATTERNS

BACKGROUND

Bandwidth measurement is an essential part of any network traffic engineering solution, including solutions using a Software-defined Wide Area Network (SD-WAN). The framework needs to know how much bandwidth is available on each network path before deciding where to place/route and load balance the network traffic.

In a closed system, it is possible to collect direct measurements on each of the network devices on the paths of the traffic. However, in many cases, it is not possible to collect direct measurements. For example, the network devices may be in different administrative domains, or may be hidden by tunneling or encapsulation. This is the case for SD-WAN also, where the SD-WAN gateway tries to direct traffic to the best path over the Internet.

BRIEF DESCRIPTION OF THE DRAWINGS

The present disclosure, in accordance with one or more various examples, is described in detail with reference to the following figures. The figures are provided for purposes of illustration only and merely depict typical examples.

Figure 1:
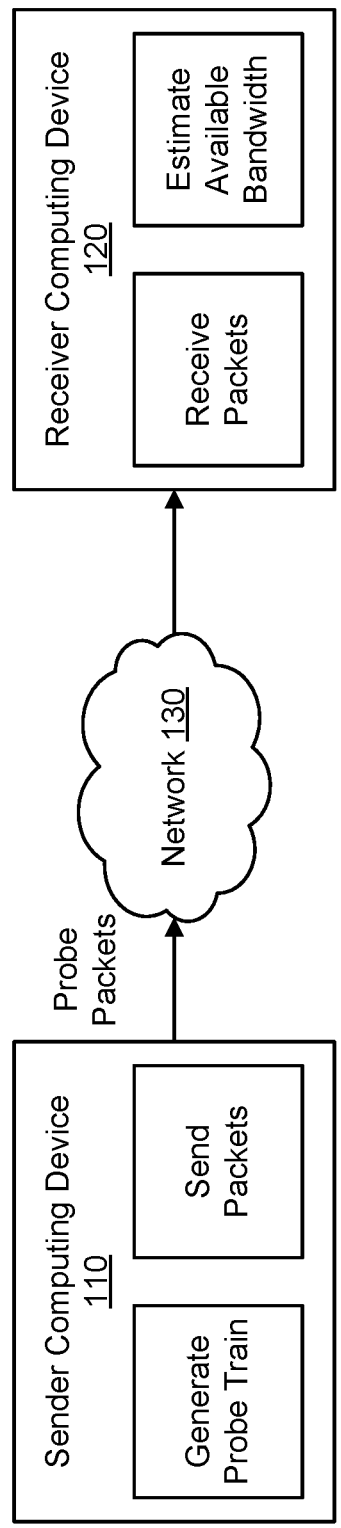
FIG. 1 illustrates a computing environment for implementing bandwidth estimation in accordance with some examples of the disclosure.

The figures are not exhaustive and do not limit the present disclosure to the precise form disclosed.

DETAILED DESCRIPTION

As alluded to above, bandwidth measurement can be difficult to perform in an SD-WAN architecture. When direct measurements are not possible, bandwidth estimation can be implemented from two end-points that can be controlled or otherwise used for measurements. For example, bandwidth estimation can be performed by probing a network path with specially crafted probe packets sent from one end of the network path to the other end of the network path. A receiver end-point measures a receive time of the specially crafted probe packets, as well as any changes to the queue delay/time pattern to estimate the path characteristics, such as the path capacity, the available bandwidth, or the bulk transfer capacity.

In some examples, a Probe Rate Model (PRM) can be used to estimate the available bandwidth of a network path (e.g., using research projects including PathChirp, Path-Cos++, SLDRT, etc.). The PRM can create a temporary congestion state (e.g., a number of data packets transmitted on the network over a threshold value to reduce available bandwidth across the network, etc.). Once the temporary congestion state is created on the network path, a controller can measure the increase in queuing delay of probe packets to infer when the network path is in a congested state. By determining when the network path is in a congested state and when it's not, such methods can then compute an estimate of the available bandwidth.

However, the PRM can have several limitations. For example, the standard PRM may use packet timing to infer a congested state and may assume that there are no packet losses on the network path. However, buffers on the network path are not infinite, and so if the congestion is significant enough, packet losses (lost/dropped packets) can occur. Further, some network devices react to a congested state by exclusively producing packet losses and never increasing queuing delay, which defeats the purpose of PRM methods and prevents them from measuring available bandwidth. In addition, some network links are unreliable, and may drop packets randomly, also hindering bandwidth estimation.

Examples of the present disclosure are directed to a filtering technique that can enable available bandwidth (e.g., on a network path) to be estimated in the presence of moderate losses caused by certain queue management techniques, e.g., a tail-drop queue. As will be described in greater detail below, tail-drop queue is an example of a likely cause of dropped packets (packet losses). In some examples, the "signature" of packet losses caused by a particular queue management technique, such as tail-drop queuing, may be recognized, and bandwidth estimation can be performed. In this way, bandwidth estimation can be performed in scenarios were classic/conventional PRM techniques fail (recalling PRM assumes no packet losses).

In particular, certain types of packet losses (or causes of packet losses) can be associated with certain packet loss patterns. If a particular pattern of packet loss is identified, this recognition of a type or category of packet loss can be the basis for determining whether or not to use an estimate made using a bump detection algorithm (BDA), which is described in greater detail below. That is, when packet losses exist on a network path due to certain types of packet queue transmission mechanisms, methods, or models, BDA can be used to perform bandwidth estimation with an expectation that the estimated available bandwidth will be an accurate estimate. In other scenarios, BDA-based bandwidth estimation can result in erroneous available bandwidth estimates (typically an overestimation of available bandwidth). Accordingly, when the pattern of packet loss is identified (from its signature) as being one with which BDA can be performed to accurately estimate available bandwidth on a network path, the BDA-based bandwidth estimate may be used to place/route and load balance network traffic, or otherwise used to engage in network traffic engineering, take other network-related action(s), or reported out.

As will also be described in greater detail below, loss bump filtering/loss bump filters (LBF) may be used, where LBF can refer to defining a zone in the received probe or chirp train in which packet losses can be ignored. This zone can be defined based on packets selected by the BDA, or based on the one-way delay (OWD) of packets. However, at or outside of such packets/measuring points, losses may still occur, and in such cases, LBF can be used to measure those losses to determine if the need exists to prevent potentially erroneous bandwidth estimates from being used. In some examples, when such losses relative to a threshold indicate ignorable or otherwise acceptable packet losses, e.g., fall below the threshold, the BDA bandwidth estimate may be considered accurate, and can be reported to a user, subsequently used to route/balance traffic, etc. If not, the BDA-based bandwidth estimate is considered to be inaccurate, and the BDA-based bandwidth estimate is not relied upon to route/balance traffic.

FIG. 1 illustrates a computing environment for implementing various bandwidth estimation processes. As illustrated in FIG. 1, sender computing device 110 transmits one or more data packets to receiver computing device 120 via network 130. Sender computing device 110 and receiver computing device 120 (e.g., clients, servers, etc.) may be endpoints in a communication network that connects the endpoints. Various sender computing devices may send data packets to various receiver computing devices, although a single sender computing device and a single receiver computing device is provided for simplicity of explanation.

An available bandwidth may be determined for sending network communications between sender computing device 110 and receiver computing device 120, e.g., a network path. Network bandwidth may correspond with how much of the bandwidth is not used and how much network traffic could be added to the network path. The network path may be composed of a number of wired or wireless communication links to transmit data over network 130 in a given amount of time. The available bandwidth may be reduced by traffic that is already using the network path.

Network traffic engineering is one example of where available bandwidth can be used. The communication path via network 130 between sender computing device 110 and receiver computing device 120 may include multiple possible paths from one endpoint to another. Having multiple paths between endpoints usually improves the resilience to failure and may increase the network bandwidth.

In network traffic engineering, the properties of network traffic, as well as the relevant network elements and their connectivity, can be determined to both help design the network and direct traffic onto different paths in that network. In some examples, the primary path between sender computing device 110 and receiver computing device 120 can add a secondary path to be used in case of failure of the primary path.

Network traffic engineering may be composed of three parts. The first part is measurement, where some attributes of the traffic and/or network are measured. The measurement portion of network traffic engineering can incorporate the available bandwidth determination(s) of various network paths, as described herein. The second part is optimization, where an optimal distribution of traffic is computed. The third part is control, where the network is reconfigured to implement the desired distribution of traffic.

Another context in which network bandwidth estimation process includes Software Defined Networking (SDN). Software Defined Networking (SDN) may manage networks by defining Application Programming Interfaces (APIs). The APIs can allow the system to decouple the datapath (e.g., packet forwarding) and the control plane (e.g., protocol intelligence) of network elements. In other words, a network controller, an entity outside the network element, can have fine-grained control and visibility over that network element. This can be used by the network controller to change the policy of network elements dynamically or to centralize the control plane and decision making of the network.

The SDN approach may be combined with network traffic engineering.

For example, SDN APIs usually define both measurement and control, and this can enable the network controller to measure network bandwidth or capacity, and dictate a distribution of traffic through network traffic engineering.

One of the limitations of SDN is that it assumes a tight coupling between the network controller and the network elements. This can work at small to medium scale communication networks, but usually cannot scale to larger networks. The efficiency of the SDN process is diminished if the network between the network controller and network elements has limited performance (e.g., low bandwidth or high latency). Moreover, the SDN approach usually does not allow for the crossing of administrative domain boundaries, because different entities can only trust controlled and limited interactions between each other.

Another example where available bandwidth can be used is in a Software Defined Wide Area Network (SD-WAN). The SD-WAN process may be implemented in computing environments that are distributed across multiple physical locations, including where sender computing device 110 and receiver computing device 120 are in different physical locations. In consequence, the computing environment may comprise a set of Local Area Networks (LANs) supporting the local physical locations of the entity and a set of Wide Area Network (WAN) links connecting those local networks to each other.

For example, a large bank or retailer may have multiple physical locations and branches. Each location or branch has a set of LANs. In a traditional configuration, all the branches and locations connect to a few central locations using dedicated WAN links (e.g., using routing techniques like Multiprotocol Label Switching (MPLS), etc.) and the few central locations can connect to an external network (e.g., the Internet, etc.) using one or more WAN links. The dedicated WAN links may be provided by a telecommunications company, which generally correspond with high availability and quality of service guarantees, but also have a high monetary cost.

The SD-WAN process proposes to use SDN principles to manage WAN connectivity. This can offer centralized visibility and control over the WAN connectivity of the entity and to reduce the cost of WAN connectivity. SD-WAN can reduce the cost by replacing dedicated WAN links by tunnels over the Internet. In this case, each branch and location has WAN links connected to the Internet, usually using a cheap consumer WAN technology (e.g., digital subscriber line (DSL) modem, cable modem, Wireless 3G, etc.). The network can implement a special SD-WAN gateway in each branch and location to create the private tunnels (e.g., virtual private network (VPN), etc.) to connect securely to other branches and locations over the WAN links and the Internet.

Another example where available bandwidth can be used is Tunnel Handoff. When an SD-WAN gateway detects that a WAN link is down, the gateway can direct traffic away from that WAN link to a tunnel not using that particular WAN link, also called the tunnel handoff. The SD-WAN gateway can create parallel tunnels over network 130 using each WAN link, and then use network traffic engineering to direct traffic to the most appropriate tunnel with the goal of optimally using the available network capacity. In some examples, the SD-WAN gateway can monitor the performance of each tunnel, in terms of latency and throughput, and then load balance traffic or map each traffic type to the most appropriate tunnel for that traffic.

One component of such traffic engineering is a way to measure the performance of each tunnel. Each tunnel defines a network path across the network, the tunneled packets are processed by a number of network elements. The network path used by a tunnel (e.g., outside the tunnel) and the network path within a tunnel are logically different in that they have different addresses. However, in some cases, two network paths can go through the same network elements, have almost the same performance, and their performance characteristics are strongly correlated. Therefore, measuring the performance of an tunnel can be done by measuring the network path outside the tunnel or inside the tunnel.

In some examples, it is difficult to determine the bandwidth estimation for the tunnel handoff process. For example, a direct measurement or a SDN approach cannot be used for those network paths, because the vast majority of the network elements of an Internet path are in different administrative domains (e.g., the various ISPs on the path), and it would be very difficult to get the complete list of all those elements (which in most case is dynamic) and administrative access to them. In some examples, the path measurement can done via end-to-end network path estimation methods and/or by sending probe packets from one endpoint to another, sender computing device 110 to receiver computing device 120.

In particular, sender computing device 110 transmits one or more data packets to receiver computing device 120 via network 130. Sender computing device 110 and receiver computing device 120 (e.g., clients, servers, etc.) may be endpoints in a communication network that connects the endpoints. Various sender computing devices may send data packets to various receiver computing devices, although a single sender computing device and a single receiver computing device is provided for simplicity of explanation.

Sender computing device 110 may generate a probe train designed to measure the network path, and send the probe packets to receiver computing device 120 via network 130. Receiver computing device 120 may receive the probe packets and estimate the available bandwidth.

Various methods may be implemented for determining Bandwidth Estimation and Network Path Estimation. For example, when direct measurement of network elements is not possible (e.g., when they are in a different administrative domains, etc.), the next best process may be end-to-end bandwidth estimation.

End-to-end network path estimation may include active probing using data packets transmitted in network 130. For example, sender computing device 110 at one end of the network path sends special probe packets to receiver computing device 120 at the other end of the network path. Those packets may only be used to estimate bandwidth and may not carry actual data, beyond the data payload required by network path estimation itself.

The estimation process may also include passive measurements, either by measuring queuing delays experienced by existing data transmitted on the network path, or by modulating that data to have specific characteristics. Another variation is a single-ended measurement where the method initiates probe packets by sender computing device 110 that are reflected back to sender computing device 110.

Different methods may estimate different properties of the network path. Bandwidth estimation is a subset of network path estimation. Path capacity is the maximum amount of traffic bandwidth that can be sent if the network path is idle, i.e. without any competing traffic. Available bandwidth (ABW) is the remaining/residual path capacity, i.e. the capacity not currently used by other traffic. Bulk Transfer Capacity (BTC) is the bandwidth a Transmission Control Protocol (TCP) connection would get if placed on this network path. Latency is the one-way delay from sender to receiver, and round trip time (RTT) is the two way delay.

With active probing, sender computing device 110 sends a series of specially crafted probe packet patterns to receiver computing device 120. The packet pattern may be defined by the estimation method and may be designed to trigger specific behaviors from the network elements on the network path. For example, in many cases the packet pattern is a probe train (described in greater detail below, and also referred to as a chirp train), where the packets and interval between packets are intended to probe various bandwidths across the packet pattern. Receiver computing device 120 can measure the received time of the packets and compute the OWD of each packet (i.e. the time taken by a packet to reach a receiver device from a sender device). Receiver computing device 120 can examine the changes to the packet pattern. The estimation method uses a simplified network model to convert those measurements into estimates of various network path characteristics.

For bandwidth estimation, two main classes can include a probe gap model (PGM) and the aforementioned PRM. For PGM, the assumption is that two closely sent packets will see the gap between them increase in proportion to the load on the most loaded queue, due to queuing delay on that queue. For PRM, the assumption is that when packets are sent at a rate lower than the bottleneck bandwidth (a phenomenon or state where performance of a network/network path is limited due to a lack of available bandwidth to ensure packets can be received by a receiver, e.g., receiver computing device 120), the traffic pattern will be mostly unchanged, whereas when packets are sent at a rate greater than the bottleneck bandwidth, those packets will suffer extra queuing delay due to a congested state of the network path.

In practice, PGM and PRM try to infer network path congestion by trying to estimate variations in the queuing delay experienced by the packets at different network elements in the network path. The queuing delay can affect the time it takes for a packet to traverse through the network path. PGM and PRM may compare the one-way delay of various probe packets to estimate the variations in the queuing delay. For example, with PGM, two packets may be sent at a known sending interval. The measured receiving interval is assumed to be the sum of the sending interval and the difference in queuing delay between the packets.

Another illustrative network bandwidth estimation process includes Packet One-way Delay (OWD). In PRM, the method can measure the delays of received packets to determine the network path bandwidth. The measurement for each packet uses the OWD process. OWD corresponds to the time difference between when the packet was sent (e.g., sent time) by sender computing device 110, and when it was received (e.g., received time) by receiver computing device 120 via network 130. Some methods compare the OWD of multiple packets.

In some examples, the OWD of a packet may correspond with the propagation delay of the network path, the transmission time of the slowest link of the path, and the accumulated queuing delay in all the network elements in the path. For each packet, the formula to determine OWD may comprise:

$$OWD(i) = pd + st(size) + sum(qd(e,i))$$

With:
pd→total propagation delay
st(size)→slowest transmission time for this packet size
qd(e,i)→queuing delay at element e for packet i In some examples, PRM may assume a queuing model where qd(e,i) is a function of the congested state at element e when packet i arrives.

Another illustrative network bandwidth estimation process includes a PathCos++ process. PathCos++ can estimate the available bandwidth of a network path using the PRM, i.e. self congestion. For example, PathCos++ sends a periodic probe train. The time interval between two packets may define an instantaneous rate and the network will react to that rate. The probe rate may be decreased over the probe train by increasing the time between probe packets to create a congested state and then gradually relieve this congestion. The PathCos++ process can measure the relative OWD of each probe packet in the train, and try to find a pair of packets which have similar OWDs on both sides of the congestion peak. The similar OWD may correspond with packets that have similar congestion. The PathCos++ process can try to find the widest spaced packet pair and then compute the average received rate of probe packets between the two packets of the packet pair. The average received rate may be used as the available bandwidth estimate.

Another illustrative network bandwidth estimation process includes the aforementioned Bump Detection Algorithm (BDA). BDA may be integrated with PathCos++ to select a pair of packets with similar congestion on both sides of a congestion peak. The pair of packets selected may be used to estimate the available bandwidth. The quality of the available bandwidth estimate may only be as good as the selection of those packets by the BDA.

In BDA, the probe train has a decreasing rate to first create a congested state of the network path (e.g., rate higher than the bottleneck), and then second, decongest that network path (e.g., rate lower than the bottleneck). This means that across the probe train, OWD of packets goes up (a congested state), and then comes back down (a decongested state). A big bump in OWD may represent the time of maximum congestion, and packets with a similar OWD should have experienced similar congestion (e.g., a similar amount of queuing).

Another illustrative network bandwidth estimation process includes packet losses from errors and from congestion. For example, many networks are lossy, which means that packets can get lost or intentionally discarded. Some networks are lossless, meaning they guarantee that no packet get lost. The lossless networks may only work for relatively small networks, as it produces undesirable effects at scale, such as head-of-line blocking. For this reason, most large networks and network paths are considered lossy.

One reason for packet losses are bit errors in the network devices and transmission errors over noisy links. However, those errors are infrequent. Most link technologies deployed ever noisy channels, such as WiFi and 3G, use link level acknowledgement and retransmissions to conceal the link losses. Thus, actual packet losses due to noise and errors are very rare, unless the conditions are bad. The reason is that TCP congestion control assumes that packet losses are due to congestion, and thus, the way to obtain optimal performance is by eliminating link level losses.

As a consequence, on a lossy network path, packet losses are almost always caused by congestion, and persistent congestion can produce packet losses. If the input rate of traffic is consistently higher than what a link can transmit, the imbalance can be addressed by discarding the excess traffic and causing packet losses/drops. As a result, packet losses may be a reliable indicator of network congestion.

Another illustrative network bandwidth estimation process includes Basic queue—Tail-drop losses. The link between sender computing device 110 and receiver computing device 120 via network 130 may be a simple queue of fixed capacity before the link. Sender computing device 110 can transmit a packet from the queue over the link as fast as the link is capable, while sender computing device 110 can drop a packet when the queue is full.

Traffic tends to be bursty, so the queue can be leveraged to accommodate temporary excesses in input rate, while smoothing out processing at the link. As long as the queue is not full, any received packet is either transmitted (if the link is idle) or added to the queue for being transmitted when the link permits. When the queue is full, any received packet may be discarded. Packet losses can happen at the tail end of the queue, hence the name, tail-drop losses.

With constant traffic and an ideal queue, packet losses may be fine grained and spread smoothly across the chirp train. In practice however losses may be clustered and not uniformly spread across the chirp train. The first cause may be bursty cross traffic that changes the load on the queue between the burst, during which time, the queue has the opportunity to accept more probe packets. In contrast, the queue can accept less packets during the burst. The second cause may be granular queue scheduling, where multiple packets are removed from the queue together, e.g., after scheduling and filling multiple slots that are available in the queue, such that no slot opens up until the next schedule. As a result, packet losses with tail-drop are often clustered. In the received traffic at receiver computing device 120, there are sequences with little or no losses alternating with sequences of very high or complete losses. This makes the congestion signal fairly coarse.

A tail-drop queue can behave in two main ways. If the cross traffic is not saturating the queue, the queue is mostly empty. In this case, the congestion caused by the probe/chirp train can cause the queue to fill up and the queuing delay to increase, up to when the queue is full at which point the queuing delay stops increasing, and packets can start to be dropped. If the cross traffic is saturating the queue, the queue is mostly full. In this case, the congestion caused by the probe/chirp train can result in no queuing delay increase (e.g., the queue cannot get more full) and immediate packet losses. The queuing delay may fluctuate based on the burstiness of the cross traffic filling the queue.

Another illustrative network bandwidth estimation process includes Losses from Active Queue Management (AQM). AQM can remedy the defects of tail-drop, including its high queuing delay and its coarse congestion signal. AQM can add additional processing at the queue to make packet losses more proportional to the level of congestion.

AQM may implement Random Early Detection (RED), which defines a probability of losing/dropping a packet which is based on queue occupancy. When the queue is almost empty, the probability of dropping a packet is close to 0, and packet loss/drop is very unlikely. When the queue is almost full, this probability of dropped packets is higher, and thus packet loss/drop is more likely. When a packet is received, RED can use the current probability of packet loss/drop, and a random number to determine if a packet is to be discarded or put in the queue. Packet losses become more probabilistic-based queue occupancy.

AQM may implement probability algorithms other than RED (e.g., Blue, ARED, PIE, CoDel, etc.) to maintain small/sparse occupancy of the queue by dropping packets preemptively. For example, the CoDel process can try to maintain the queue delay for all packets below a threshold. In another example, the PIE process features burst protection, where no packet loss/drops occur for the first 150 ms after a queue starts to fill.

In some examples, the short train of packets used by estimation techniques may be too short to trigger a strong AQM response, and the losses caused by AQM may be very low on each chirp train. The chirp train may be much more likely to overflow the queue and cause tail-drop losses than to see significant AQM losses. As a result, for the purpose of bandwidth estimation, AQM queues can be considered to be the same as tail-drop queues.

Another illustrative network bandwidth estimation process includes rate limiters, policers, and token buckets. Rate limiters may be used to help conform network traffic to a certain rate. This may be done for policy reasons, for example, as the result of a contractual agreement.

Rate limiters may be implemented with or without a queue. When using a queue, the rate limiter is similar to a link of fixed capacity, and can be managed via tail-dropping or using an AQM. When not using a queue, the implementation of the rate limiter is simplified and can reduce resource usage. Non-queue-implemented rate limiters are often called policers or meters to distinguish them from other rate limiters. Those rate limiters can be implemented using a token bucket to accommodate traffic burstiness.

When a token bucket is implemented, the token bucket can hold virtual tokens associated with its maximum capacity, and is refilled in tokens at the desired rate. When a packet arrives, if the bucket is not empty, the packet is passed to the queue, and a token is removed. If the bucket is empty, the packet is discarded. If the link has been underused for a while, the bucket may be full and excess tokens beyond the capacity are discarded. The token bucket capacity (or burst size) can allow an unconstrained packet rate when the link has been underused.

Rate limiters based on token buckets do not have a queue, and as a result, packets may not experience additional queuing delay due to congestion. The congestion signal may correspond with a packet drop. The packet losses can be fairly fine-grained if the bucket size is appropriate for the link capacity and traffic burstiness (i.e., not too small and not too large). In practice, configuring the burst size is tricky so most token buckets do not produce smooth patterns of packet losses.

Another illustrative network bandwidth estimation process includes PRM and packet losses. PRM assumes that no probe packets are lost on the network path, and that any packet that was sent is received and can be used by the PRM method. None of the existing PRM methods attempt to tolerate packet losses, except for the NEXT-v2 process. The NEXT-v2 process assumes that packet losses are due to random link errors. When a packet is lost, the NEXT-v2 process attempts to reconstruct it by interpolating from neighboring packets. The NEXT-v2 process may tolerate limited packet losses and it may not help with losses due to congestion. Other methods can assume that if there are packet losses in a chirp train, no estimation can be performed. In such cases, the entire chirp train may be discarded, and no estimation is performed. This can significantly decrease the probability of getting a bandwidth estimate.

PRM methods may not accurately estimate available bandwidth when the bottleneck on a network path is based on a token bucket. For example, the PRM methods measure the OWD increase due to congestion. With a token bucket, there is no queue and the bottleneck may not react to congestion by increasing queuing delay. In this sense, the congested state created by the PRM method does not increase the OWD. In the presence of a token bucket, PRM methods usually fail or give an erroneous estimate. As such, PRM methods currently may not provide an estimate of available bandwidth when the bottleneck is a token bucket.

Examples of the present disclosure can improve on these and other methods of conventional bandwidth estimation by performing BDA bandwidth estimate filtering based on packet loss patterns. Based on an identified packet loss patterns, an assumption or determination can be made as to whether or not a BDA estimate may be used or assumed to be accurate. Additional actions may be performed, like automatically rerouting packets and/or load balancing network traffic in light of an acceptable BDA estimate. Implementing this process in networks may be straightforward for engineers or technicians to implement and may perform with low overhead (e.g., minimize the CPU usage, perform quickly so as not to slow down network path estimation, etc.).

As noted above, certain types or categories of packet losses can occur, four of which are described hereafter.

In accordance with a first category (Category 1), transmission errors on a link overwhelm the link layer reliability mechanism, and create packet losses (i.e., the above-described packet losses from errors and from congestion). Bit error at a network device can cause packets to be lost. However, those errors are mostly random and unrelated to congestion, and as such, are typically not deemed to be a cause of queuing delay. Due to the errors being mostly random, the packet loss pattern or signature of Category 1 packet losses is commensurately random. In some examples, if the probability of packet loss is low enough (relative to a given threshold), a BDA estimate can be deemed to be accurate enough for use. If, on the other hand, the probability is high relative to the given threshold (or maximum threshold), the BDA estimate will be discarded.

Figure 2:
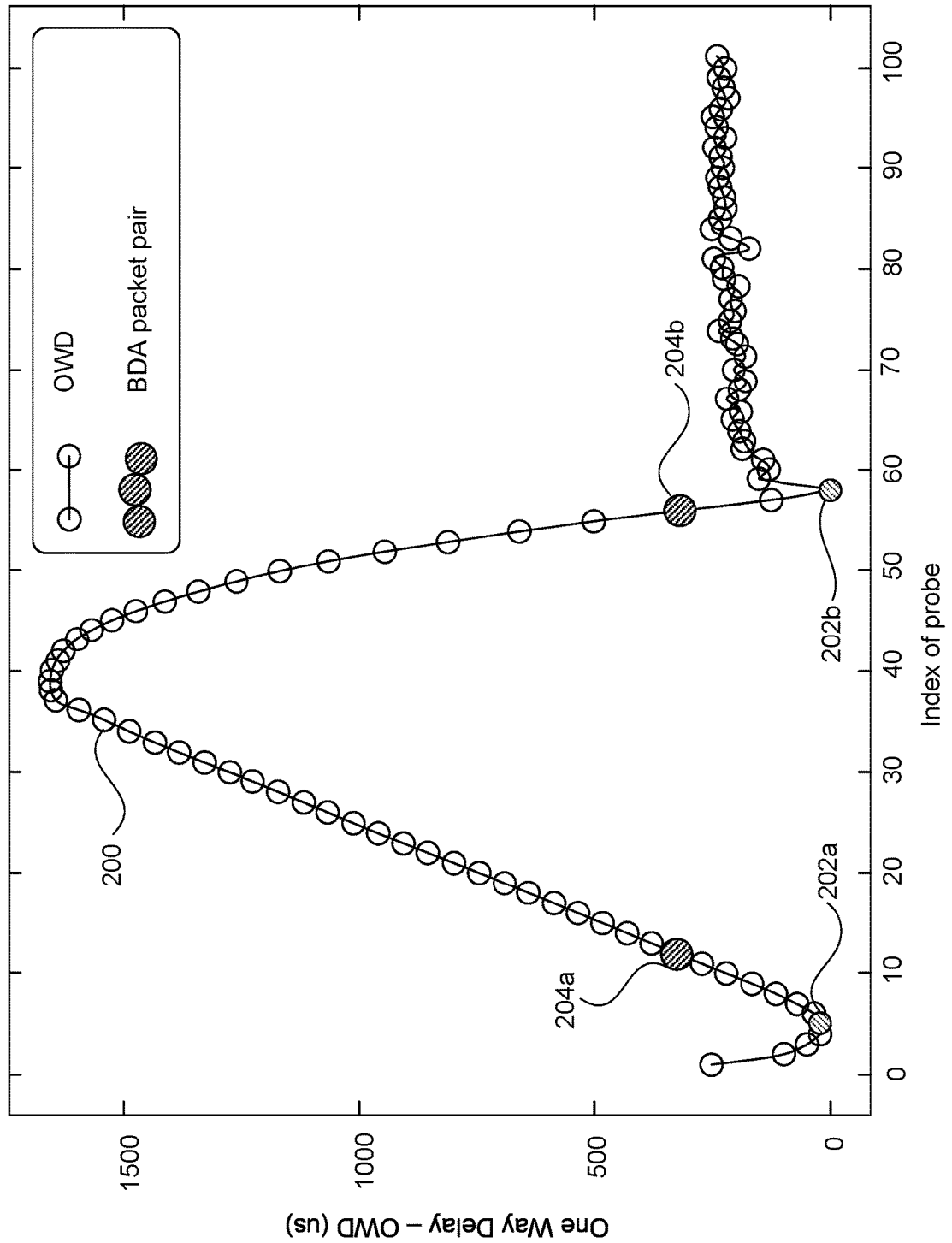
FIG. 2 illustrates an example of one-way delay measurements where no significant packet losses occur on the network path being measured, in accordance with a decreasing method bandwidth measurement use case scenario.

As illustrated by FIG. 2, an OWD (delay) bump 200 spanning zero to 1500+ microseconds across a probe index/packet 5 (202a) to approximately a probe index/packet 58 (202b) delineates the extent of congestion/period reflected as an OWD bump signifying an increase and subsequent decrease in congestion. No dropped packets (no packet losses) result from these transmissions. In this example, measurement points 204a/b (corresponding to packets) are selected by the BDA that have approximately the same OWD of about 200 microseconds during the period of increasing and decreasing OWD.

In accordance with a second category of packet losses (Category 2), a bottleneck can be realized vis-à-vis a tail-drop queue or AQM queue, which is not congested by default. Thus, by default, such queues are mostly empty, and there is no need for packets to be dropped. If additional traffic is added and subsequently causes congestion, the queue will fill up, the queuing delay will increase, and when the queue is full, packets will be dropped.

Figure 3:
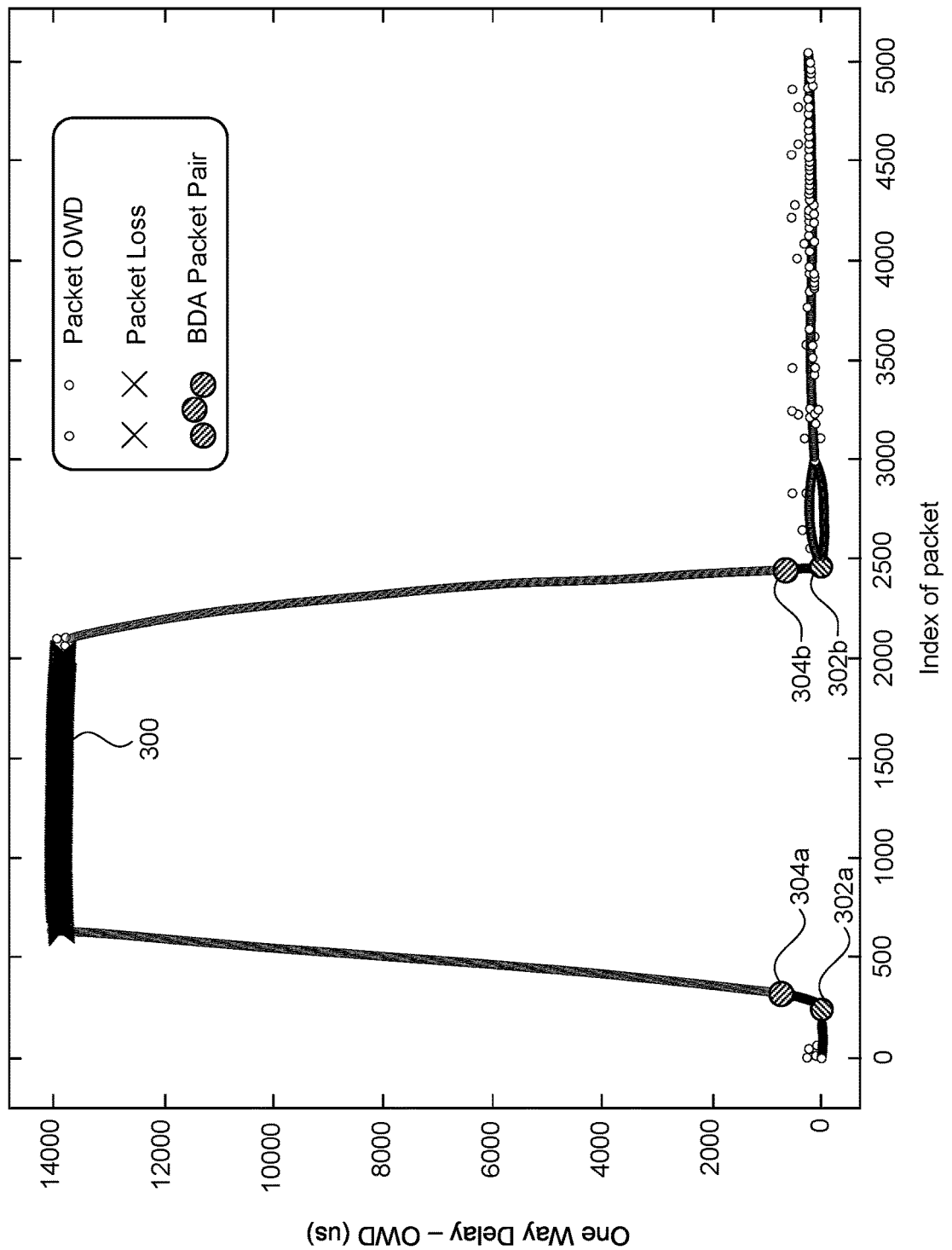
FIG. 3 illustrates an example of bandwidth measurement in accordance with a one-way delay use case scenario and losses associated with a tail-drop queue method.

FIG. 3 illustrates an example scenario where a tail-drop queue (an AQM pattern would be similar) is used to control packet transmissions, and the resulting category 2 losses. As illustrated in FIG. 3, an OWD bump 300 occurring between approximately probe index 250 and 2500 (the bounds of the OWD bump being reflected in the points corresponding to an OWD of 0, and selected measurement points, i.e., 302a/b and 304a/b, respectively). It should be appreciated that when a tail-drop (or AQM) queue is utilized, congestion may begin to occur/increase (indicated by the rise in OWD from 0 microseconds to approximately 14,000 microseconds). When the queue is filled, packets will then begin to be dropped. In FIG. 3, this packet loss occurs between approximately the 500$^{th}$ packet and the 2000$^{th}$ packet. The packet loss pattern shows this as a truncation of the OWD bump, and the selected measurement points 304a/b are "outside" of the packet loss area of the OWD bump.

In accordance with a third category (Category 3), the bottleneck may be a tail-drop queue or AQM queue, again, but which is congested by default. In other words, such a queue is mostly full, and packets exceeding the capacity of the queue will be/are dropped. If additional traffic is added and caused congestion, the queuing delay does not increase, but packet losses will increase.

In accordance with a fourth category (Category 4), the bottleneck reacts to congestion by dropping packets and not increasing queuing delay. That is, in such a scenario, a token bucket policer may be operative in the network. If the bottleneck is not congested by default, no packet losses occur, but if congestion is present, packets are dropped. If additional traffic is added and caused congestion, packet losses will, similar to Category 3, increase. It should be understood, however, that such a bottleneck does not cause any queuing delay increase. However, if there are other queues on the network path, those queues are not the bottleneck, but nevertheless often produce delay increases as they are loaded. The received packets may present delay signatures related to a queue which is not the bottleneck. As noted above, the PRM model assumes that no probe packets are lost on the network path, and that any packet that was sent is received and can be used.

Figure 5:
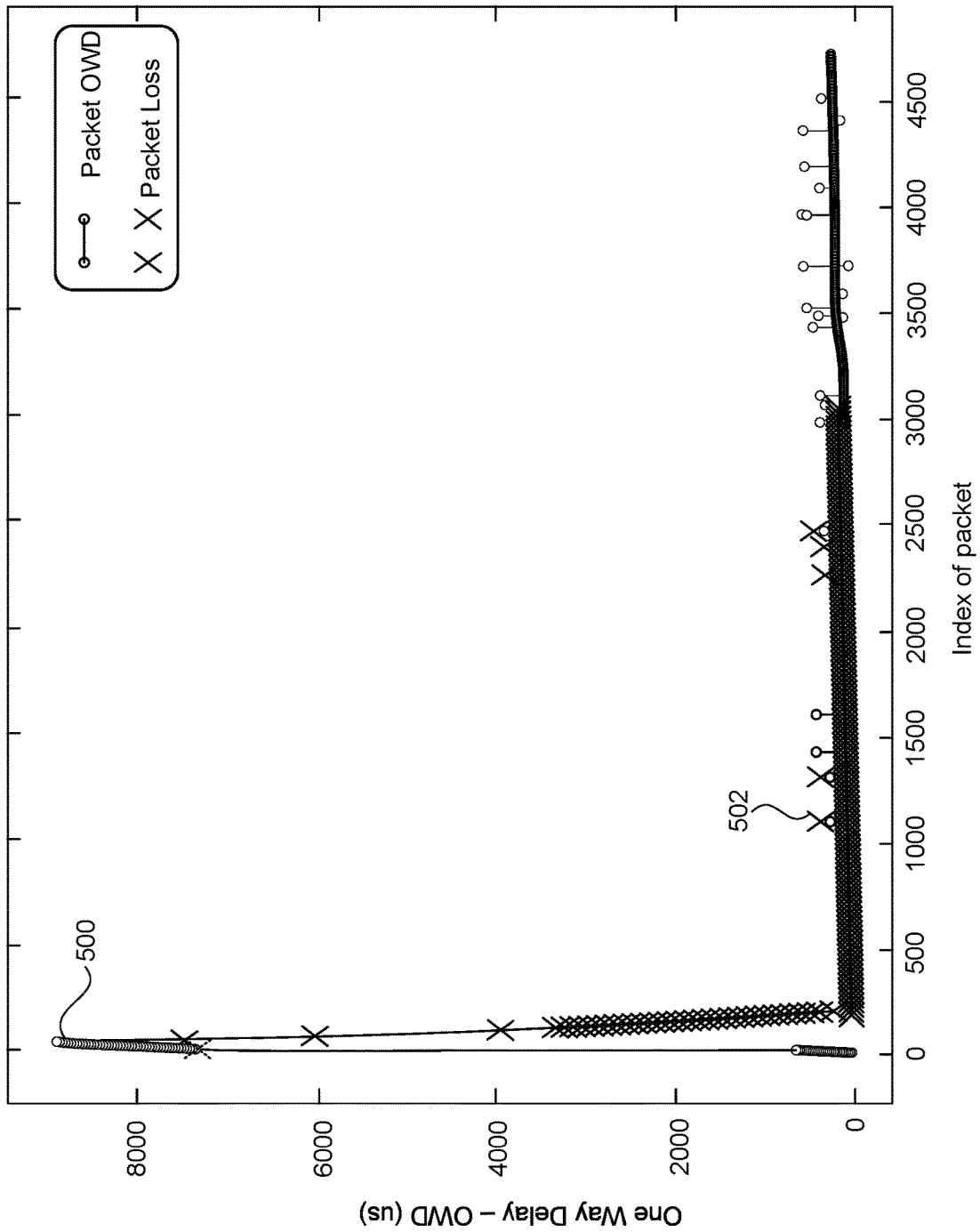
FIG. 5 illustrates an example of bandwidth measurement in accordance with a one-way delay use case scenario and losses associated with a token bucket policer method.

FIG. 5 illustrates an example scenario, where a token bucket policer is used to govern packet transmissions on a network path. It can be appreciated that an OWD bump 500 is reflected at the onset of congestion, but the OWD bump is not related to the policer/main bottleneck. It should be noted that scenarios occur where another queue may be acting as another/secondary bottleneck (as alluded to above). Hence, the bottleneck attributable to the token bucket policer is considered the main or primary bottleneck. Most token bucket policers exhibit bursting behavior, and at the onset of congestion, it takes time for the token bucket to run out of tokens and start dropping packets (resulting in packet losses), during which time, traffic can pass through the token bucket policer at a higher rate.

Additional queues may exist downstream from the token bucket policer, and during bursting they may temporarily congest and produce an OWD bump (approximately packet 0 to packet 100). Once the token bucket policer starts dropping packets, the downstream congestion is removed (approximately packet 100 to packet 200). After this, congestion results only in packet losses (approximately packet 200 to 3000).

When deploying such PRM methods on an actual network, scenarios were encountered where congestion caused packet loss, especially for longer probe trains. Most of the packet losses were observed as being Category 2 packet losses (AQM or tail-drop queues that are uncongested by default). To address, conventional PRM methods could be modified to tolerate moderate packet losses. For decreasing-rate methods using a BDA, the computation of the average received rate of probe packets between the two packets of the packet pair could be modified to take into account the missing probe packets, where the number of received packets received is used instead of the number of transmitted packets, minus the losses. Those methods are usually resilient to packet losses due to congestion, as losses are less likely to occur at the base of an OWD bump (less congestion). Although possibly sufficient to achieve accurate bandwidth estimation with Category 2-type packet losses, results in erroneous estimates when other categories of packet losses are at issue. That is, losses due to tail-drop or AQM queuing methods can be safely ignored because the congestion creates enough of a queuing delay increase to create an OWD bump, which can be used for bandwidth estimation.

However, for other categories, bandwidth estimation can be inaccurate. For example, with respect to Category 1 packet losses, if those packet losses occur after the bottleneck, the packets are subtracted from the received rate, and can lead to underestimation. For Category 3-type packet losses, queuing delay does not increase, no OWD bump is created, and thus, bandwidth estimation will fail, i.e., such packet losses will not be properly considered as impacting available bandwidth on a network path. For Category 4-type packet losses, the main bottleneck does not increase queuing delay, and does not create an OWD bump. Thus, either no OWD bump is created, and accordingly, bandwidth estimation will fail, or the OWD bump is created by a queue which is not the bottleneck, and a resulting bandwidth estimation will overestimate available bandwidth.

Examples of the present disclosure can improve bandwidth estimation by considering the rate of packet losses, and performing bandwidth estimation only when the packet losses are moderate across the probe train (e.g., less than 10% or 20%), while in other cases, the bandwidth estimate of the BDA is discarded. However, such filtering is not adequate. For example, there can be many cases where moderate packet losses can be caused by Category 1 or Category 4-type scenarios, which can lead to bandwidth estimation error(s). There are also scenarios where heavy packet losses occur due to control using tail-drop or AQM queues, and where estimation could be done with BDA.

Examples of the present disclosure are directed to LBF, where packet losses associated with a particular type(s) of packet loss categories can be handled, but can do so without expensive computations and without adding estimation error to an available bandwidth estimate. Examples of the present disclosure may analyze packet loss patterns to determine if packet losses (dropped packets) occur within an OWD bump. If so, such packet losses can be assumed to be commensurate with Category 2-type packet losses, and as will be described below, a BDA estimate can be assumed to be accurate/accurate enough for use in network traffic engineering or other applications/contexts requiring knowledge of available bandwidth on a network path. If not, i.e., a packet loss pattern is associated with another Category type, an assumption can be made that the BDA will produce an inaccurate or erroneous estimate of available bandwidth, and that estimate can be discarded, ignored, or otherwise, not used.

In other words, a determination can be made regarding whether or not BDA estimation is acceptable in the event packet losses are present on a probe train, thereby allowing packet losses to be integrated (a considered factor) into PRM bandwidth estimation techniques. In particular, better determinations can be made regarding when BDA can be used on probe trains with packet losses, with only minor adjustments to traditional BDA when used in popular estimation methods. Thus, examples of the present disclosure can be implemented easily, and CPU usage and other overheads can be minimized/minimal. This can aid in avoiding slowdowns due to network path BDA estimation.

Referring back to FIG. 2, when a probe train for use in BDA-based estimation is properly configured, a congestion peak arises followed by a drop/decongestion. Without the occurrence of any dropped packets, the signature of such a scenario is an OWD bump, again, with delay rising and returning back to uncongested delay. After the OWD bump, the delay pattern tracks (more or less) the minimum OWD threshold. With the occurrence of packet losses caused by the use of a tail-drop queue or AQM queue, referring back to FIG. 3, it can be appreciated that the OWD bump is the same/similar as without packet losses, except that the upper portion of the OWD bump is truncated. Thus, instead of delay rising to a particular level/value, the delay is capped when the tail-drop or AQM queue is full. As discussed above, packet losses occur when the queue is full—it is the only time when packets are dropped, which coincides with high delay, and the typical signature of such a Category 2 scenario is such that packet losses occur at the middle portion of the OWD bump, i.e., the highest point of congestion.

The other aforementioned categories of packet losses do not present this unique signature. Transmission losses (Category 1) are randomly and evenly spread across the whole chirp train, independent of congestion. In the case of an already saturated queue (Category 3), the queue is always congested, and therefore packet losses occur throughout the entire probe train. When token bucket policing is used, (Category 4), packet losses are expected to occur until the probing rate is lower than the rate of the token bucket, where the token bucket produces no delay increase. If there is an OWD bump associated with another queue (temporarily congested downstream queue), such as described above, this queue is not the cause of the main bottleneck, and has a rate higher than the ABW. As a result, the OWD bump terminates before the ABW, and packet losses can extend beyond the end of the OWD bump. As can be appreciated from FIG. 5, the occurrence of dropped packets/packet losses extends beyond the OWD bump, and the OWD bump terminates before packet losses subside/no longer occur.

As previously noted, the BDA detects an OWD bump in a received probe train, select two packets in the OWD bump, and then performs measurements between those two packets that can be used to extrapolate an estimated amount of available bandwidth. The manner in which various BDAs perform those tasks can differ (e.g., PathCos++, SLDRT, Voyager-2, Voyager3 may use different methods of selecting measurement points/packets). However most BDAs attempt to find two packets on either side of the OWD bump, close to the bottom of the OWD bump (i.e., close to the beginning of the rise in congestion and close to end of the decongestion prior to a return to normal). Oftentimes, BDAs do not attempt to perform measurements across the entirety of an OWDbump. Rather, most BDAs simply identify two measurement points, i.e., packets in a probe train with the same/similar congestion levels, with which to determine an available bandwidth estimate.

Figure 6:
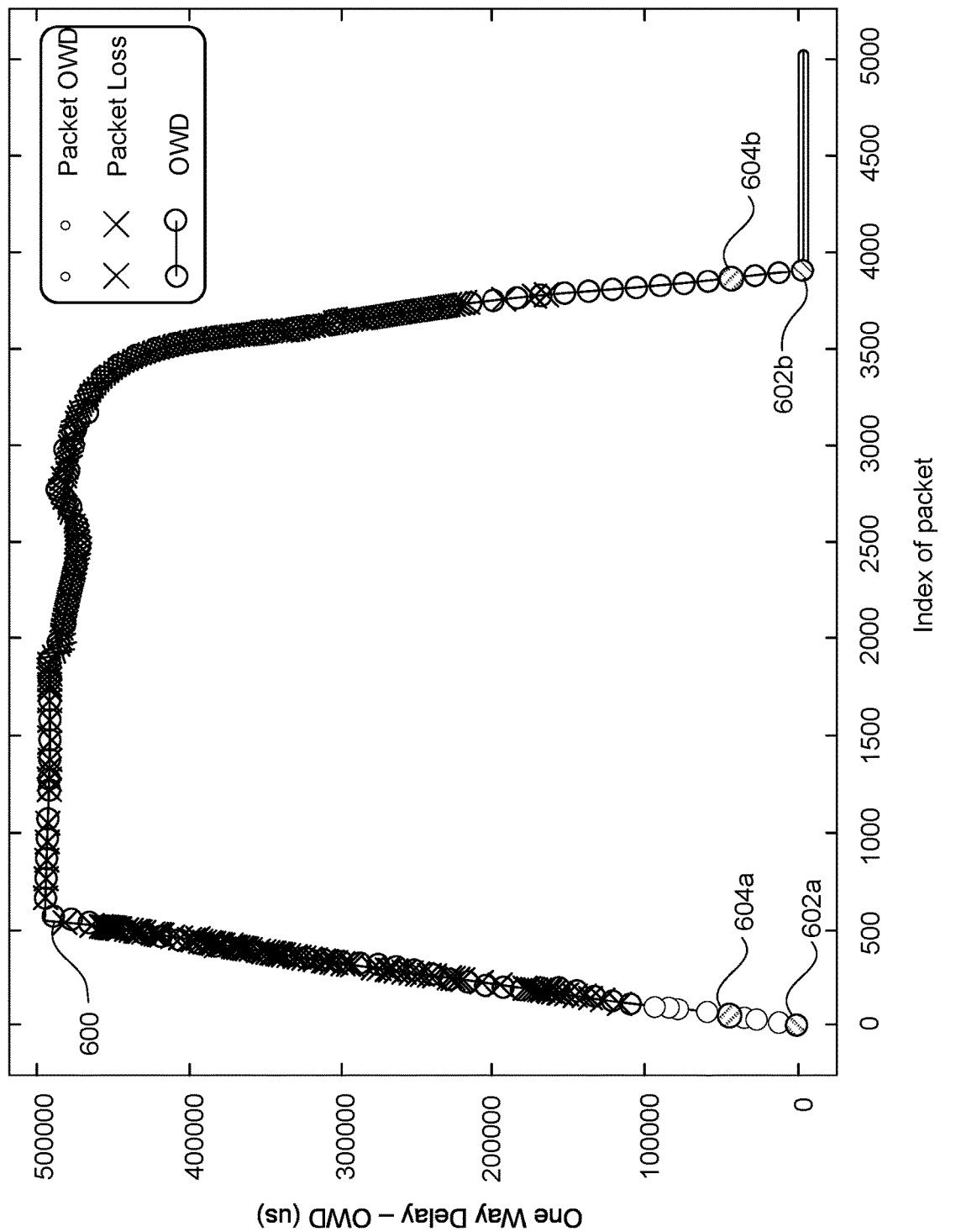
FIG. 6 illustrates an example of a tail-drop queue resulting from active queue management.

When a tail-drop or AQM queue is not yet saturated, packet losses are expected to occur at the top of the OWD bump as previously discussed. However, due to variations in delay and batching of losses, in various scenarios, the top portion of an OWD bump may not be well-defined, and packet losses may occur during low queue utilization, i.e., when the OWD is still relatively small. Some queues process packets in batches causing packet losses to be clustered together, and the OWD at the top of the OWD bump to be characterized by jagged or non-flat signature. Referring now to FIG. 6, an example scenario where packet drops are caused by tail-drop and AQM at a congested queue is illustrated. It should be understood that the goal of AQM is to begin dropping packets before the queue is full. In this way, a TCP sender can detect congestion earlier. When used with TCP, AQM allows TCP to react faster and avoid filling an entire queue. In FIG. 6, packet losses due to tail-drop are occurring at the top of the OWD bump 600, between packets 500 and 3000. Packet losses due to AQM are occurring while the queue is filling up (increasing delay), between packets 100 and 500, and while the queue is shrinking (decreasing delay), between packets 3000 and 3800. It can be appreciated that packet losses start before OWD reaches the top of OWD bump 600, and continues after OWD starts going down. Thus, the zone of packet losses occurs approximately between packets 200 to 3800, and the top of the OWD bump 600 is not strictly flat, as the AQM reduces queue size. It should be understood that the "top" of an OWD bump can refer to the portion(s) of an OWD bump where packet OWD is close to the maximum OWD (for example, the difference to the maximum OWD is less than about 10% of the difference between the maximum and minimum OWD). This is in contrast to strict tail-drop queuing where packet losses occur only at the top of the OWD bump (FIG. 3), although AQM need not necessarily be the only reason why losses occur outside of the boundaries of the top of an OWD bump. For example, other network elements on a particular network path may have variable delays, adding noise to any OWD measurement.

As discussed above, BDAs assume that when the packets selected as measurement points have been processed by the queue, the delay experienced by those packets properly reflects the congestion level. If packet losses do occur, the delay does not represent the full congestion. Therefore, for accurate measurements, there should not be packet losses around those selected packets/measurement points (at least, no significant packet losses). If there are packet losses in the portion of the OWD bump between the measurement points, it can be assumed that they are mostly caused by unsaturated tail-drop, and such packet losses can be safely ignored as long as they are not close to the measurement points. On the other hand, any significant packet losses occurring approximately at or outside of those packets (for example, to the left of the first measurement point/packet 302a and to the right of the second measurement point/packet 302b illustrated in FIG. 3) suggests that the packet losses are due to another cause and that the bandwidth estimate is inaccurate, and should not be used.

Figure 4:
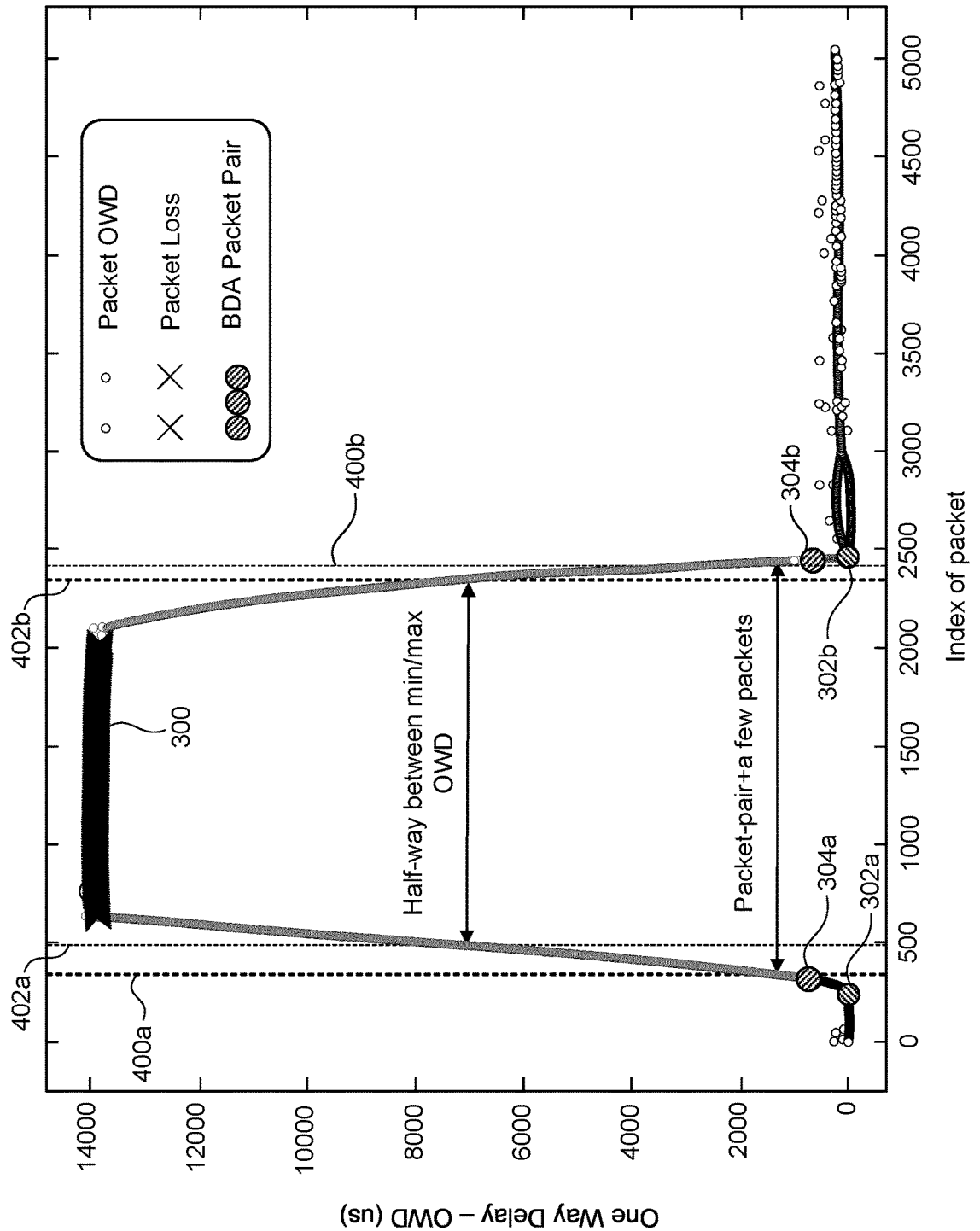
FIG. 4 illustrates an example of defining a tail-loss filter used to ignore losses caused by tail-drop queues.

The zone of ignorable packet losses can be defined based on the packets selected/used for measurements (FIG. 4). Because the packets used for measurements are a consideration for obtaining accurate BDA estimates, this zone can comprise some number of packets before/after the actual measurement points/packets where packet loss occurrence is acceptable, in other words, such packet losses can be ignored. Typically, one to three packets before/after the actual measurement points or packets is sufficient to capture the occurrence of acceptable (or not) packet losses, although the actual number of packets that precede/follow the measuring points/packet-pair can vary, based, e.g., on a given percentage of the increasing/decreasing portions or zones/areas of the OWD bump. That is, to ensure (or to attempt to ensure as much as possible) that the selected packet-pair (measuring points) is not impacted by packet losses, where ideally, packet losses next to/nearby the packet-pair should not exist, or in some cases, at least be rare. In accordance with some examples of the disclosed technology, the zone of ignorable packet losses excludes a few packets close to a packet-pair. This number of packets can be statically configured, it can be a fraction of the total number of packets in the chirp train, or it can be based on other measurements performed by the receiver. For example, if this number of packets is two, the zone of ignorable packet losses extends from two packets after a first measurement point/packet through two packets before a second measurement point/packet. The effect is that a resulting bandwidth estimate may be discarded if there are significant packet losses in an initial part of the probe train (up to 2 packets after the first measurement packet), and in the last part of the probe train (starting 2 packets before the second measurement packet).

FIG. 4 illustrates such an example, where the dotted lines 402a/b corresponding to (approximately) packets 400 and 2200 delineate the extent of a zone of ignorable packet losses based on packets selected for measurement. In FIG. 4, dotted lines 402a/b correspond to approximately two packets after point 302a and approximately two packets before point 304b delineating the "threshold" area outside the zone of ignorable packet losses. That is, a resulting bandwidth estimate may be discarded if there are significant packet losses (above a threshold) in the initial part of the probe train (from the first packet up to line 402a, and two packets after the first measurement packet) 304a, and in the last part of the probe train (starting at line 402b, two packets before the second measurement packet 304b, to the last packet). On the other hand, the packet losses 300 caused by tail-drop are entirely between lines 402a/b, and therefore in the zone of ignorable packet losses, and will not cause the bandwidth estimate to be discarded.

In other examples, alternatives to defining a zone of ignorable packet losses, may include, but is not limited to, e.g., defining a top of the OWD bump based on delay, or even using the full extent/width of the OWD bump to determine whether packet losses fall into an acceptable range. In some examples, an ignorable zone of packet losses can be defined by two packets, whose associated OWD delay occur approximately half-way between a bottom (lowest delay value) and top/peak (maximum delay value) of the OWD bump. FIG. 4 illustrates such an example, where lines 400a/b can define the extent of the zone of ignorable packet losses, and can be chosen based on packets half-way between minimum and maximum OWDs. As can be appreciated, the packet losses 300 caused by tail-drop are entirely between lines 400a/b, and thus in the zone of ignorable packet losses.

It should be understood that, generally, it cannot be assumed that the portion of the probe train outside the zone of ignorable packet losses (either 400a/b or 402a/b) will be entirely loss free, due to the noisy/bursty distribution of losses and transmissions errors (Category 1). Accordingly, determining whether or not a BDA estimate can be used should be robust enough to account for real-world conditions (i.e., noise and bursty nature). In some examples, this robustness is achieved via use of a packet loss percentage threshold that can be used to account for such characteristics of the probe train/network.

In particular, if the percentage of packet loss outside the zone of ignorable packet losses is a relatively low value, e.g., below a user defined threshold by some determined amount, e.g., a default 5%, it can be assumed that the packet loss occurring prior to or after the OWD bump is attributable merely to noise/transmission loss (Category 1), rather than "actual" packet loss due to another packet loss category. Thus, when packet losses are below this threshold, BDA estimates may be used. Such a threshold is usually much lower than packet loss thresholds that applied to the entire probe train. This stricter threshold is possible because packet loss is expected to be within the boundaries of the OWD bump rather than at or outside the measurement points/packets, where there is a lower expectation of packet loss occurrence. As a result, in some examples, more BDA estimates arising from probe trains may be discarded when packet losses are due to other conditions/reasons. That stricter filtering, in turn, results in BDA estimates that are more accurate.

Figure 7:
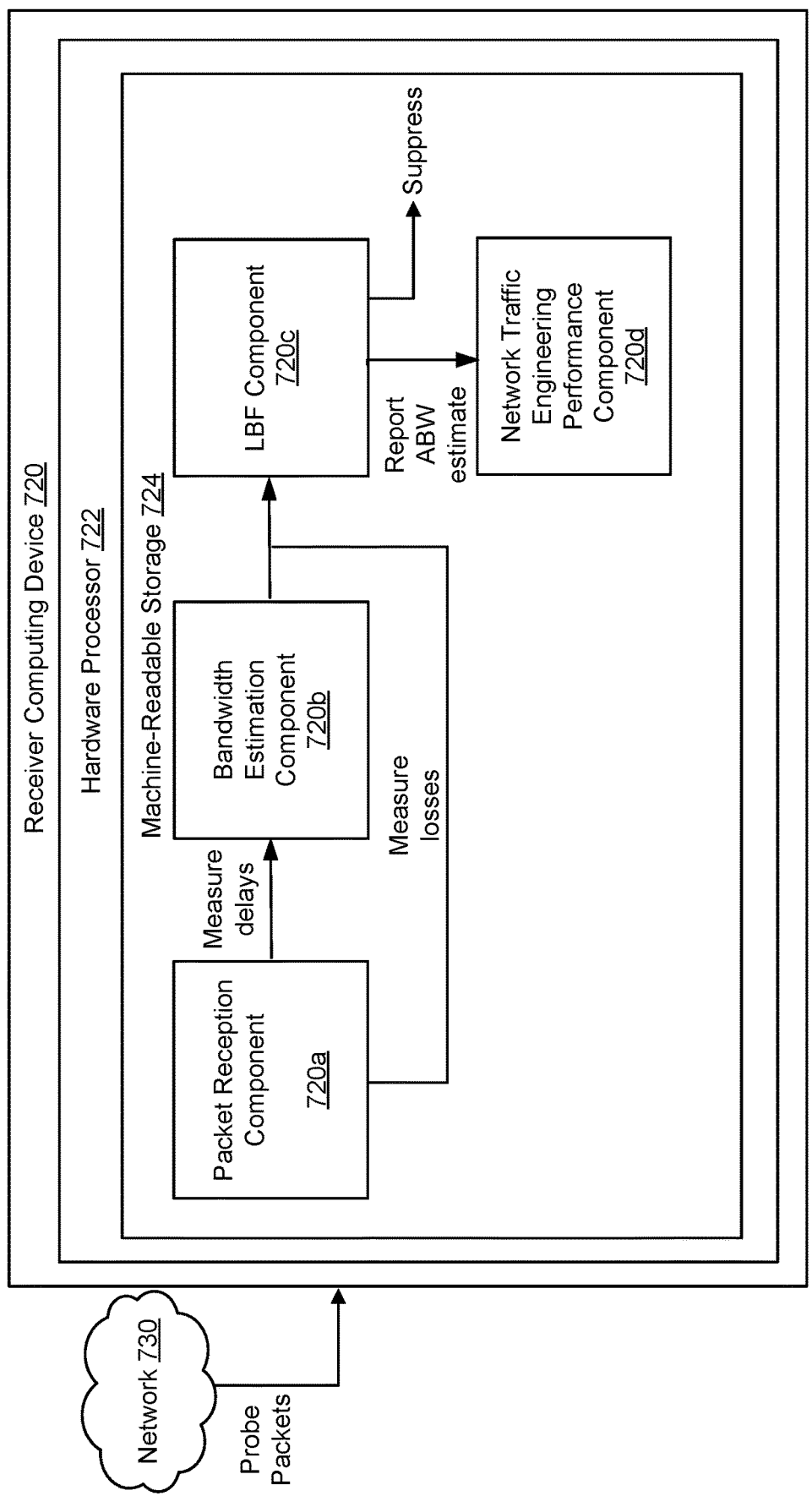
FIG. 7 illustrates a summary of processes for determining a bandwidth estimate, in accordance with some examples of the application.
Figure 8:
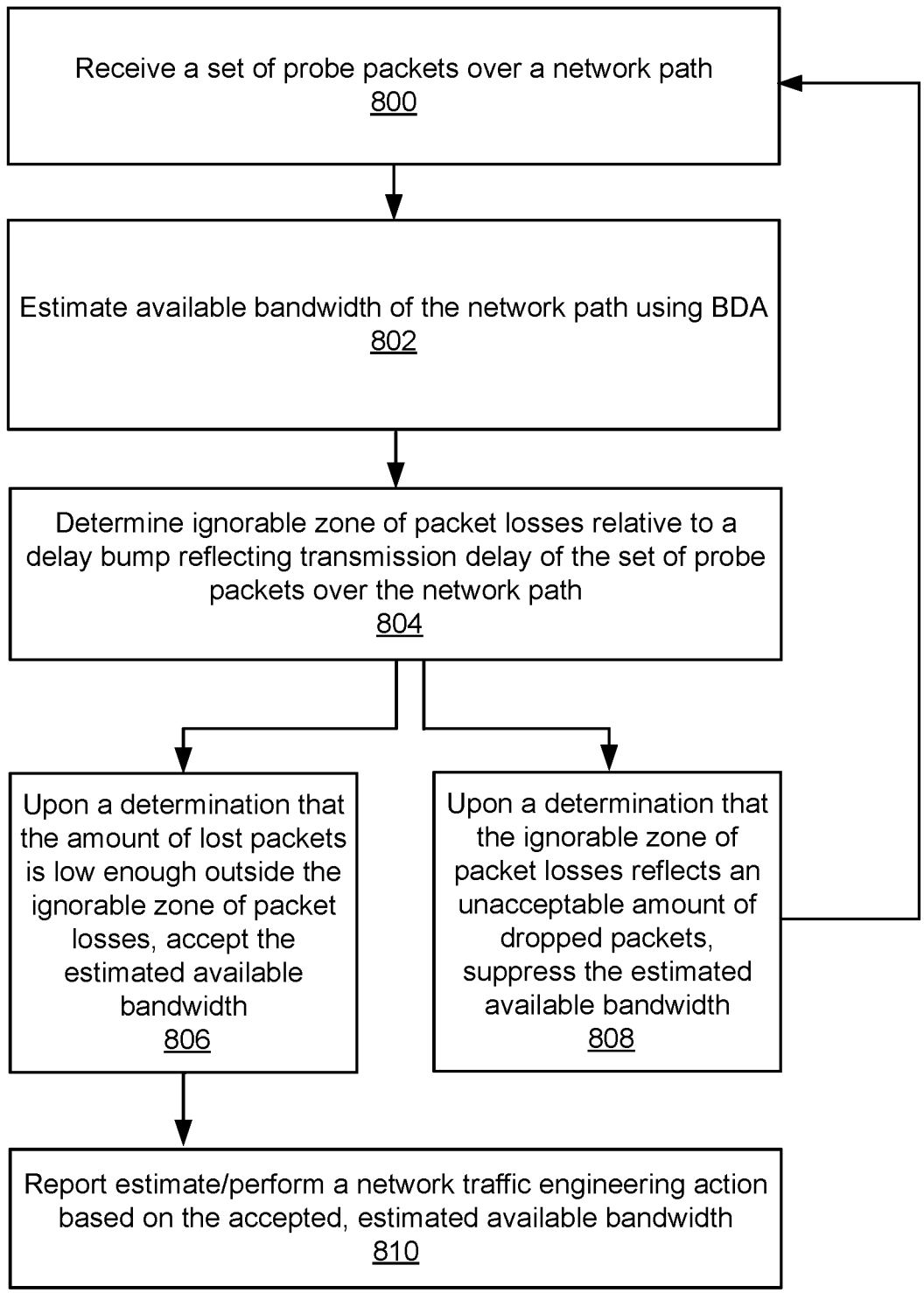
FIG. 8 is an example computing component that may be used to implement various features of examples described in the present disclosure.

FIGS. 7 and 8 illustrate a system and corresponding method of operation for bandwidth estimate filtering in accordance with one example of the disclosed technology, and will be described in conjunction with one another. As illustrated in FIG. 7, a receiver computing device 720, such as a network device or element may receive a set of probe packets (set of packets) over a network path from a network 730 (similar to the scenario illustrated in FIG. 1).

Receiver computing device 720 may comprise one or more computing components embodied by a hardware processor 722, e.g., one or more central processing units (CPUs), semiconductor-based microprocessors, and/or other hardware devices suitable for retrieval and execution of instructions stored in machine-readable storage medium 724. Hardware processor 722 may fetch, decode, and execute instructions, such as instructions embodying the method/operations illustrated in FIG. 8 as described in greater detail below. As an alternative or in addition to retrieving and executing instructions, hardware processor 722 may include one or more electronic circuits that include electronic components for performing the functionality of one or more instructions, such as a field programmable gate array (FPGA), application specific integrated circuit (ASIC), or other electronic circuits.\

A machine-readable storage medium, such as machine-readable storage medium 724, may be any electronic, magnetic, optical, or other physical storage device that contains or stores executable instructions. Thus, machine-readable storage medium 724 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 724 may be a non-transitory storage medium, where the term "non-transitory" does not encompass transitory propagating signals. As described in detail below, machine-readable storage medium 724 may be encoded with executable instructions.

In some examples, receiver computing device 720 may comprise a packet reception component 720a. As illustrated in FIG. 8, a set of probe packets is received over a network path at operation 800. The set of probe packets may be a sequence of data packets comprising a probe train as discussed above, with a specific time interval between each probe packet departures. The time intervals between packets define an instantaneous rate, and the network can react to that rate by either leaving that interval mostly unchanged or spacing out the packets. The probe packets can be sent in order to inject delay/congestion onto the network path so a bandwidth estimate can be performed.

In some examples, receiver computing device 720 may comprise a bandwidth estimation component 720b. Delays are measured on the network path, and can be input into bandwidth estimation component 720b. As previously discussed, the delay associated with received packets can be measured to determine the network path bandwidth using the OWD process. Additionally, any packet losses are also measured, and can be input into LBF component 720c (described below).

For example, and as illustrated in FIG. 8, available bandwidth of the network path using BDA is estimated at operation 802. Again, BDA involves selecting a pair of packets with similar congestion on both sides of a congestion peak or OWD bump. The pair of packets that are selected to be used as measurement points can be used to estimate the available bandwidth in the presence of a bottleneck that reacts to a congested state by dropping packets, i.e., creating packet losses). In BDA, the probe train has a decreasing rate to first create a congested state of the network path (e.g., rate higher than the bottleneck), and then second, decongest that network path (e.g., rate lower than the bottleneck). This means that across the probe train, OWD of packets goes up (a congested state), and then comes back down (a decongested state). When the bottleneck arises due to the use of tail-drop queuing or AQM, which is not congested by default, the addition of traffic/increased traffic subsequently causes congestion. The queue will fill up, the queuing delay will increase, and when the queue is full, packets will be dropped.

Due to noise, the bursty nature of packet transmissions, as well as transmission errors, some leeway or margin of error is provided. In some examples, this margin of error can be provided by an LBF component 720c, which can determine whether an ignorable zone of packet losses 720 exists near the measuring points/packet-pair. As illustrated in FIG. 8, an ignorable zone of packet losses relative to an OWD bump reflecting transmission delay/congestion of the set of probe packets over the network path is determined at operation 804. In some examples, a particular threshold may be set relative to the zone of ignorable packet losses. When packets are dropped at a rate that is reasonable (e.g., falls within a given threshold or is otherwise acceptable), an assumption can be made that dropped packets are occurring due to the tail-drop or AQM queue becoming full, in which case, the bandwidth estimate derived using BDA, which ignores packets losses can be deemed to be accurate. That is, at operation 806, upon a determination that the amount of dropped packets is low enough outside the zone of ignorable packet losses, the estimated available bandwidth may be accepted for use in some subsequent action(s), e.g., such as actions associated with network traffic engineering. In other words, an available bandwidth estimate can be reported to network traffic engineering performance component 720d. When packets are dropped at a rate that is unreasonable (e.g., falls outside a given threshold or is otherwise unacceptable), an assumption can be made that dropped packets are occurring due to some reason(s) other than the tail-drop or AQM queue becoming full, in which case, the bandwidth estimate derived using BDA, which ignores packets losses cannot be deemed to be accurate. That is, the packet losses cannot be reasonably ignored. Hence, at operation 808, upon a determination that the ignorable zone of packet losses reflects an unacceptable amount of dropped packets, the estimated available bandwidth may be discarded or otherwise suppressed. In some example, another one or more BDA-based estimates may be performed, where another set of probe packets is received and analyzed as described herein. At operation 810, the estimate of available bandwidth can be reported out and/or used to perform a network traffic engineering action.

In some examples, the ignorable zone correlates to some subset of packets of the probe train proximate to the measurement points/packets falling within some threshold level of acceptance. For example, a two-packet ignorable zone can be specified or selected, where the two packets are based on the packets used for measurement by BDA. In other examples, the two packets may be packets bounded by the measurement points/packets. In other examples, the two packets are specified based on a maximum delay of the OWD bump identified by the BDA. In still other examples, the two packets can be specified based on the entirety of the OWD bump. The threshold applied can vary, but in some examples, the threshold can be computed based on the maximum and minimum amount of delay occurring within the OWD bump. In some examples, the threshold may be a strict/absolute filter, where packet losses at or near the measurement points/packets are totally unacceptable, meaning all packet losses must occur within the OWD bump in order for such a bandwidth estimate to be acceptable.

It should be understood that examples described herein are premised on ignoring packet losses in an OWD bump. A benefit to ignoring packet losses in the OWD bump is that doing so enables bandwidth estimation to be done under more conditions or scenarios. Moreover, ignoring packet losses in the OWD bump allows bandwidth estimates to be determined (and used) whereas, previously, no such bandwidth estimates would have been available and sufficiently accurate. Further still, the accuracy of bandwidth estimates obtained by looking for specific category 2-type bottlenecks or path loss patterns as described herein can be increased because stricter thresholds can be implemented to eliminate or disregard probe trains with unwanted packet losses. Ultimately, better available bandwidth estimates improves network traffic engineering efficiency, especially in the context of SD-WAN. Yet another benefit is that ignoring packet losses in the disclosed manner is an uncomplicated modification of known (sometimes best) methods used to measure available bandwidth. Examples of the disclosed technology can be retrofitted or adapted for use in most network implementations without having to restructure the code or change packet formats.

Figure 9:
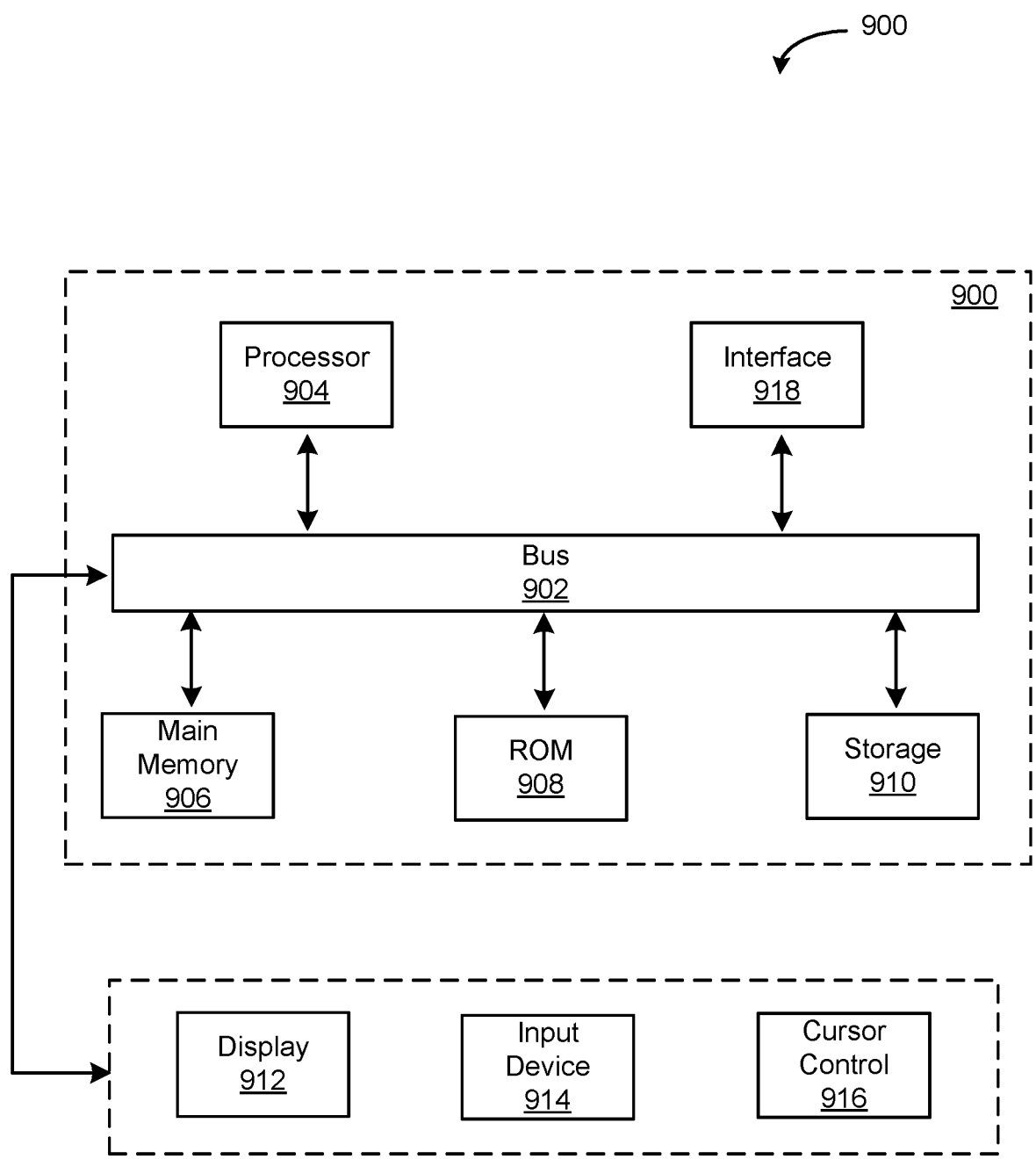
FIG. 9 depicts a block diagram of an example computer system in which various of the examples described herein may be implemented.

FIG. 9 depicts a block diagram of an example computer system 900 in which various of the examples described herein may be implemented. For example, sender computing device 110 or receiver computing device 120 illustrated in FIG. 1 may be implemented as example computer system 900 in FIG. 9. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some examples, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one example, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes network interface 918 coupled to bus 902. Network interface 918 provides a two-way data communication coupling to one or more network links that are connected to one or more local networks. For example, network interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 918, which carry the digital data to and from computer system 900, are example forms of transmission media.

The computer system 900 can send messages and receive data, including program code, through the network(s), network link and network interface 918. In the Internet example, a server might transmit a requested code for an application program through the Internet, the ISP, the local network and network interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   receiving a set of probe packets over a network path;
   estimating, by a system comprising a hardware processor, an available bandwidth of the network path using a bump detection algorithm (BDA);
   identifying, by the system, a delay bump experienced by a first subset of probe packets of the set of probe packets over the network path, the first subset of probe packets comprising a range of probe packets between a packet pair of the BDA, wherein transmission delays of the delay bump experienced by the first subset of probe packets are greater than transmission delays experienced by a remainder of the set of probe packets;
   identifying, by the system, an ignorable zone based on the delay bump, the ignorable zone comprising the first subset of probe packets, wherein packet losses of probe packets in the ignorable zone are ignored in estimating the available bandwidth;
   determining, by the system, an amount of lost probe packets associated with probe packets outside the ignorable zone;
   determining, by the system, whether the amount of lost probe packets violates a threshold; and
   based on determining that the amount of lost probe packets violates the threshold, suppressing, by the system, the estimated available bandwidth from use in directing data traffic along network paths.

2. The method of claim 1, wherein the estimating of the available bandwidth using the BDA comprises:
   selecting a first probe packet of the set of probe packets on a first side of the delay bump, and selecting a second probe packet of the set of probe packets on a different second side of the delay bump, the first probe packet and the second probe packet forming the packet pair of the BDA, and
   calculating the estimated available bandwidth based on the first and second probe packets.

3. The method of claim 2, wherein the ignorable zone is identified based on the first and second probe packets.

4. The method of claim 3, comprising determining the ignorable zone as starting at a first specified number of probe packets after the first probe packet and terminating at a second specified number of probe packets before the second probe packet.

5. The system of claim 4, wherein the first and second specified numbers of probe packets are based on a configured fraction of a number of probe packets in the first subset of probe packets that experienced the delay bump.

6. The method of claim 3, wherein the ignorable zone is identified based on a ratio between a smallest and greatest one-way delay within the delay bump.

7. The method of claim 6, comprising determining the ignorable zone as starting at the first probe packet at which a one-way delay is greater than the ratio and terminating at the second probe packet at which a one-way delay is greater than the ratio.

8. The method of claim 1, wherein the amount of lost probe packets violates the threshold if the amount of lost probe packets exceeds the threshold.

9. The method of claim 1, wherein packet losses experienced by the first subset of probe packets are ignored for estimating the available bandwidth.

10. The method of claim 1, further comprising:
based on determining that the amount of lost probe packets does not violate the threshold, using the estimated available bandwidth in directing data traffic along network paths.

11. A system comprising:
a hardware processor; and
a non-transitory storage medium storing instructions executable on the hardware processor to:
receive a set of probe packets over a network path;
measure transmission delays experienced by probe packets of the set of probe packets;
estimate an available bandwidth of the network path based on the measured transmission delays using a bump detection algorithm (BDA);
identify a delay bump experienced by a first subset of probe packets of the set of probe packets over the network path, the first subset of probe packets comprising a range of probe packets between a packet pair of the BDA, wherein transmission delays of the delay bump experienced by the first subset of probe packets are greater than transmission delays experienced by a remainder of the set of probe packets;
identify an ignorable zone based on the delay bump, the ignorable zone comprising the first subset of probe packets, wherein packet losses of probe packets in the ignorable zone are ignored in estimating the available bandwidth;
determine an amount of lost probe packets associated with probe packets outside the ignorable zone;
determine whether the amount of lost probe packets violates a threshold; and
based on determining that the amount of lost probe packets violates the threshold, suppress the estimated available bandwidth from use in directing data traffic along network paths.

12. The system of claim 11, wherein the measured transmission delays comprise one-way delays.

13. The system of claim 11, wherein the estimating of the available bandwidth comprises:
selecting a first probe packet of the set of probe packets on a first side of the delay bump, and selecting a second probe packet of the set of probe packets on a different second side of the delay bump, the first probe packet and the second probe packet forming the packet pair of the BDA, and
calculating the estimated available bandwidth based on the first and second probe packets.

14. The system of claim 13, wherein the instructions are executable on the hardware processor to determine the ignorable zone as starting at a first specified number of probe packets after the first probe packet and terminating at a second specified number of probe packets before the second probe packet.

15. The system of claim 14, wherein the first and second specified numbers of probe packets are based on a configured fraction of a number of probe packets in the first subset of probe packets that experienced the delay bump.

16. The system of claim 13, wherein the ignorable zone is identified based on a ratio between a smallest and greatest one-way delay within the delay bump.

17. The system of claim 16, wherein the instructions are executable on the hardware processor to determine the ignorable zone as starting at the first probe packet at which a one-way delay is greater than the ratio and terminating at the second probe packet at which a one-way delay is greater than the ratio.

18. The system of claim 11, wherein the instructions are executable on the hardware processor to:
based on determining that the amount of lost probe packets does not violate the threshold, using the estimated available bandwidth in directing data traffic along network paths.

19. A non-transitory machine-readable storage medium comprising instructions that upon execution cause a system to:
receive a set of probe packets over a network path;
measure transmission delays experienced by probe packets of the set of probe packets;
estimate an available bandwidth of the network path based on the measured transmission delays using a bump detection algorithm (BDA);
identify a delay bump experienced by a first subset of probe packets of the set of probe packets over the network path, the first subset of probe packets comprising a range of probe packets between a packet pair of the BDA, wherein transmission delays of the delay bump experienced by the first subset of probe packets are greater than transmission delays experienced by a remainder of the set of probe packets;
identify an ignorable zone based on the delay bump, the ignorable zone comprising the first subset of probe packets, wherein packet losses of probe packets in the ignorable zone are ignored in estimating the available bandwidth;
determine an amount of lost probe packets associated with probe packets outside the ignorable zone;
determine whether the amount of lost probe packets violates a threshold; and
based on determining that the amount of lost probe packets violates the threshold, suppress the estimated available bandwidth from use in directing data traffic along network paths.

20. The non-transitory machine-readable storage medium of claim 19, wherein the delay bump is identified by the BDA.

* * * * *